2,961,355
Patented Nov. 22, 1960

2,961,355

METHOD OF AND SOLVENT FOR REMOVING INORGANIC FLUORIDE SCALE DEPOSITS

Alvin F. Beale, Jr., Tulsa, Okla., and Arthur Lee Larsen, Denver, Colo., assignors to The Dow Chemical Company, Midland, Mich., a corporation of Delaware No Drawing. Filed Jan. 20, 1958, Ser. No. 709,740

7 Claims. (Cl. 134—27)

This invention concerns the removal of scale from metal surfaces especially the inner surfaces of tubes, pipes, and confining vessels in which a fluorine-containing fluid circulates.

Circulating systems for heat control and for transferring fluid form a part of a number of industrial processing units. Dissolved and suspended materials in the fluid result in the formation of scale on the inner surfaces on the confining ducts and containers. The scale is frequently hard and adheres tenaciously to the surfaces. It usually accretes until a layer of scale deposit has built up. As a result thereof, passageways in the system become restricted and not uncommonly completely obstructed. The scale has high thermal insulating properties and, therefore, its presence entails extra fuel and handling costs. High maintenance costs and lost production time often ensue as a result of the insulating properties of the scale because the walls of the confining ducts and vessels must be heated to a much higher temperature than that necessary for the same vessels prior to the accumulation of scale. The high temperature often weakens the walls thereby shortening the service life of the metals and even rupturing the walls entirely.

The composition of the deposit varies according to the temperature and inherent properties of the circulating fluid, the materials contained in the circulating fluid, and the shape and the composition of the contacting surfaces of the container.

The removal of the scale from the steam boilers, heat exchange units, compressors, and the like have long been a matter of serious concern. Solvents for the deposits which do not also appreciably attack the walls of the vessels have been employed with varying degrees of success. Aqueous solutions of from 1 to 30 percent HCl, and usually from 3 to 15 percent, and containing an inhibitor against corrosive attack on the metal, are among the known solutions employed in attempts to remove the scale.

Among the materials forming scale deposits are the less soluble sulfates and carbonates of the alkaline earth metals, e.g., barium sulfate, calcium carbonate, and calcium sulfate, and inorganic fluorides, particularly those of the alkali and alkaline earth metals.

Improved solvents and methods of removing scale deposits consisting largely of carbonates and sulfates of alkaline earth metals particularly from heat exchange units having bends from which solvents are not readily removed are described in copending application Serial No. 659,744, filed May 17, 1957, and those for removing iron-containing scale are described in copending application Serial No. 639,623, filed February 12, 1957.

The methods described in the above designated copending applications have definite advantages over previously known scale solvents for the removal of scales containing iron, calcium, magnesium, and barium carbonates and sulfates.

However, in a number of industrial operations, fluids composed of or containing fluorine compounds are employed wherein such fluids contact valves and the surfaces of vessels, pipes, and other equipment. Such industrial operations include the production of lithium metals and lithium compounds and in the removal of fluorine-containing impurities in the refining of metals such as aluminum.

These fluorine-containing compounds form thermally insulating obstructing deposits or scales which thus far have resisted adequate removal by known methods. There is, therefore, a desideratum in the art for an improved solvent for fluorine-containing scale and for a method of removing that scale from the walls of confining pipes and vessels and from the surfaces of equipment used to transfer fluorine-containing materials generally.

An object of the invention is to provide an improved solvent for dissolving fluorine-containing scale. A further object is to provide a method of removing fluorine-containing scale from the walls of coils, transfer lines, and vessels. These and related objects will appear as the description of the invention proceeds.

The invention, therefore, consists essentially of an improved solvent for inorganic fluorides and a method of removing inorganic fluoride scale from the walls of confining lines and vessels by the use of such solvent.

The solvent of the invention consists of boric acid or an alkali metal borate, e.g., borax, dissolved or slurried in hydrochloric acid. A corrosion inhibitor to metal attack by the acid in an amount between about 0.1 and 1.0 percent by weight is preferably added to the solvent of the invention. Only an amount of boric acid or the borate up to the saturation point is usually employed. However, an amount in excess of the amount soluble therein may advantageously be employed where an excessive amount of the fluorine-containing scale must be dissolved. The fluorine-containing scale is removed by filling the lines or vessels to be descaled with the thus-prepared solvent; heating the solvent thus in contact with the inner walls of the lines or vessels at a temperature between 80° and 200° F. for from 2 to 20 hours or until an appreciable percentage of the scale is dissolved, usually at about 150° F. for about 4 hours; and draining and flushing the lines or vessels with water. The lines or vessels are thereafter preferably filled with a dilute alkaline solution, e.g., a 1 to 5 percent sodium hydroxide aqueous solution which is drained and the lines or vessels flushed out with water.

As illustrative of the invention tests were made of the solubility of calcium fluoride in the solvent of the invention as contrasted to its solubility in an aqueous solution of either $H_3BO_3$ or HCl alone. For this purpose a two gram sample of $CaF_2$ scale, taken from the inner walls of transfer lines in industrial equipment used in refining aluminum metal, was placed in each of three separate containers: one containing the solvent of the invention, a second one containing a water solution of $H_3BO_3$ only, and the third one containing a water solution of HCl only; the containers were held at 150° F. for 16 hours. The results, expressed as solubility percentages, obtained from the samples placed in the solutions of $H_3BO_3$ or HCl only are designated Blanks 1–6; those obtained from the samples placed in the solvent of the invention are designated Examples 1–6 in Table I.

The reaction which occurs when the solvent of the invention consists of an aqueous solution of $H_3BO_3$ and HCl is thought to be:

(1) $4HCl + 2CaF_2 + H_3BO_3 \rightarrow HBF_4 + 2CaCl_2 + 3H_2O$

In other words, 4 moles of HCl and 1 mole of $H_3BO_3$ react with 2 moles of $CaF_2$ to form water-soluble products according to the above equation.

When the solvent of the invention consists of a water solution of HCl and borax (disregarding the water of crystallization), the reaction which is thought to take place is:

(2) $18HCl + 8CaF_2 + Na_2B_4O_7 \rightarrow$
$\qquad 4HBF_4 + 8CaCl_2 + 7H_2O + 2NaCl$ According to Equation 1 above, to dissolve 2 grams of $CaF_2$, 1.866 grams of HCl and 0.792 gram of $H_3BO_3$ are required, or to dissolve 1 gram of $CaF_2$, 0.933 gram of HCl, and 0.396 gram of $H_3BO_3$ are required. According to Equation 2 above, 1 mole of $Na_2B_4O_7$ and 18 moles of HCl react with 8 moles of $CaF_2$ so that 2 grams of $CaF_2$ requires $$\frac{201.27 \times 2}{78.08 \times 8}$$

or 0.645 gram of borax for its conversion to water-soluble products.

The solvent of the invention employed in Examples 1–5 was prepared by adding $H_3BO_3$ to a 5 percent by weight hydrochloric acid solution in amounts to produce a concentration of 2.1 percent and that in Example 6 by adding an amount of borax which yielded the equivalent of a 2.1 percent concentration of boric acid in the HCl solution according to the equation:

(3) $HCl + Na_2B_4O_7 + H_2O \rightarrow 4H_3BO_3 + 2NaCl$

The use of the 2.1 percent $H_3BO_3$ solution is based on the following calculations:

Since according to Equation 1, 0.396 gram of $H_3BO_3$ and 0.933 gram of HCl are required per gram of the calcium fluoride to be dissolved, a weight ratio of $H_3BO_3$ to HCl of about 1:2.36 is required in the solution. Substituting 5 percent for 2.36 percent of HCl, a concentration of about 2.1 percent $H_3BO_3$ in the 5 percent HCl solution results. The concentration of the solvent was such that 36.5 milliliters thereof contained the stoichiometric quantity of $H_3BO_3$ in accordance with Equation 1, or the amount of $Na_2B_4O_7$ necessary to produce the stoichiometric quantity of $H_3BO_3$ according to Equation 3, to react with 2 grams of $CaF_2$.

In the aforementioned tests the solubility percentage was ascertained by determining the loss of weight of the sample of scale subjected to the dissolving action of the solution and converting the loss of weight to percent of the sample weight. In more detail, the sample was weighed before the test. After the test the weight of the undissolved portion of the sample was found by passing the solvent through a Gooch crucible and weighing that which was retained thereon, that amount being the undissolved portion. The portion passing through, i.e., the dissolved portion, was found by subtraction and its fractional part of the original sample calculated by dividing the dissolved portion by the weight of the original sample and this fraction then converted to percent.

Table I below sets out the results of the tests in solubility percentages. In Table I, multiples of 36.5 milliliters of solvent were used since 36.5 milliliters of the examples therein contain 1 stoichiometric quantity of $H_3BO_3$ or a sufficient amount of $Na_2B_4O_7$ to yield the stoichiometric quantity of $H_3BO_3$ (Equation 3) to react with 2 grams of $CaF_2$ according to Equation 1. In other words, 36.5 milliliters of solvent contain 1.866 grams of HCl and/or 0.792 gram of $H_3BO_3$, or, as in Example 6, sufficient $Na_2B_4O_7$ to yield 0.792 gram of $H_3BO_3$.

*Table I*

| Test Number | Ml. of Solvent | Stoichiometric Quantity [1] | Solvent | Solubility Percentage |
|---|---|---|---|---|
| Blank 1 | 73.0 | | 5 Percent HCl | 59.3 |
| Blank 2 | 36.5 | | do | 38.0 |
| Blank 3 | 36.5 | | 10 Percent HCl | 49.0 |
| Blank 4 | 36.5 | | 15 Percent HCl | 53.5 |
| Blank 5 | 18.3 | | 5 Percent HCl | 19.8 |
| Blank 6 | 36.5 | 1 | 2.1 Percent $H_3BO_3$ | <1.0 |
| Example 1 | 73.0 | 2 | 2.1 Percent $H_3BO_3$ in 5 percent HCl | 99.0 |
| Example 2 | 36.5 | 1 | do | 66.0 |
| Example 3 | 18.25 | 0.5 | do | 42.5 |
| Example 4 | 9.13 | 0.25 | do | 22.6 |
| Example 5 | 4.56 | 0.125 | do | 11.6 |
| Example 6 | 36.5 | Equivalent to 1.0 $H_3BO_3$. | $Na_2B_4O_7$ equivalent to 2.1 percent $H_3BO_3$ in 5 percent HCl. | 67.0 |

[1] Stoichiometric quantity of $H_3BO_3$ or equivalent of borax, contained in solvent necessary to react with 2 grams of $CaF_2$ according to Equation 1.

To show the solubility of LiF scale in HCl alone and in the solvent of the invention, Blanks 7 and 8 wherein HCl alone was employed as a solvent, and Examples 7 and 8 employing 2.1 percent $H_3BO_3$ in 5 percent HCl were run. The equation representing the reaction when employing the solvent of the invention employing $H_3BO_3$ is thought to be:

(4) $4HCl + 4LiF + H_3BO_3 \rightarrow HBF_4 + 4LiCl + 3H_2O$

According to the above equation, 1 mole of $H_3BO_3$ reacts with 4 moles of LiF. 1.5 grams of 90 percent LiF scale were placed in the solvent shown in Table II below. To react with 1.5 grams of LiF, 0.89 gram of $H_3BO_3$ is required. The solvent was prepared so that 40 milliliters thereof contained the stoichiometric amount of $H_3BO_3$ to react with 1.5 grams of LiF. The scale was subjected to the action of the solvent for 4 hours at 150° F.

*Table II*

| Test Number | Ml. of Solvent | Solvent Used | Solubility Percentage |
|---|---|---|---|
| Blank 7 | 40 | 5 Percent HCl only | 50.0 |
| Blank 8 | 80 | do | 59.6 |
| Example 7 | 40 | 2.1 Percent $H_3BO_3$ in 5 percent HCl. | 93.4 |
| Example 8 | 80 | do | 94.5 |

To show the solubility of other metal fluorides in the solvent of the invention, the fluorides shown in Table III, below, were placed in a solution consisting of 2.1 percent $H_3BO_3$ in 5 percent HCl as in the preceding examples. The solvent was prepared so that 36.5 milliliters contained the stoichiometric quantity of $H_3BO_3$ based on the probable conversion of the metal fluoride of Table III to $HBF_4$ and the metal chloride. The fluoride to be dissolved was subjected to the action of the solvent of the invention for 16 hours at 150° F.

*Table III*

| Test Numbers | Type of Fluoride Used | Grams of Fluoride Used | Solubility Percentage |
|---|---|---|---|
| Example 9 | $AlF_3 \cdot 3H_2O$ | 2.45 | 98 |
| Example 10 | $BaF_2$ | 4.40 | 82 |
| Example 11 | $MgF_2$ | 1.55 | 93 |
| Example 12 | $Na_3AlF_6$ | 1.80 | 90 |
| Example 13 | $CaF_2 \cdot 3Ca_3P_2O_8$ | 2.50 | 92 |

Tables I, II, and III show that when the stoichiometric quantity of $H_3BO_3$ in a 5 percent aqueous solution of HCl is employed, based upon the conversion of the fluoride scale to HBF$_4$ and to the metal chloride, at least 90 percent of LiF, AlF$_3 \cdot$3H$_2$O, MgF$_2$, Na$_3$AlF$_6$, and $$CaF_2 \cdot 3Ca_3P_2O_8$$

and 82 percent of BaF$_2$ were dissolved. When twice the stoichiometric quantity of H$_3$BO$_3$ is employed, 99 percent of the CaF$_2$ scale dissolved. There is an advantage in adding at least twice the stoichiometric quantity of H$_3$BO$_3$. Up to 5 times the stoichiometric quantity may be used.

The amount of H$_3$BO$_3$ which can be dissolved in HCl is limited by the solubility of H$_3$BO$_3$ in HCl. The solubility of H$_3$BO$_3$ expressed in weight percent concentration of saturation in various weight percent aqueous solutions of HCl at 78.8° F., as set out in international Critical Tables, Volume IV, page 309, is given in Table IV following:

Table IV

| HCl Weight Percentage | Solubility of H$_3$BO$_3$ in Weight Percent |
|---|---|
| 0 (water) | 5.6 |
| 0.48 | 5.5 |
| 0.95 | 5.4 |
| 1.43 | 5.2 |
| 4.80 | 4.0 |
| 7.90 | 3.35 |
| 15.80 | 1.9 |
| 25.80 | 2.0 |
| 34.70 | 2.1 |

In carrying out the invention the concentration of the HCl may vary rather widely. From 3 percent to 30 percent HCl may be used. However, 5 to 15 percent HCl is recommended. From Table IV, it can be seen that not more than 5.6 percent of H$_3$BO$_3$ can be dissolved in water and that the solubility in hydrochloric acid solution is even less at 78.8° F. Although it is desirable to dissolve the H$_3$BO$_3$ or borax in the hydrochloric acid, the invention may be practiced by adding an excess of either H$_3$BO$_3$ or an alkali metal borate, or a mixture of both and employing the resulting slurry to remove fluorine-containing scale.

For practical purposes, about 2.1 percent solution of H$_3$BO$_3$ in a 5 percent solution of HCl, as used in the examples, is usually used based upon the calculations shown hereinbefore.

The least amount of H$_3$BO$_3$ useful for practicing the invention in relation to the amount of scale to be dissolved may be based on an examination of Example 5 of Table I which shows that an appreciable amount of calcium fluoride dissolves when only 0.125 times the stoichiometric quantity required by Equation 1 is used. In other words, to react with 2 grams CaF$_2$, as little as 0.125 times 0.792 gram of H$_3$BO$_3$ in 5 percent HCl, or 0.049 gram of H$_3$BO$_3$ per gram of CaF$_2$ scale is effective. Lower concentrations might be employed but are not recommended. Between 1 and 2 times the stoichiometric quantities of H$_3$BO$_3$ and HCl required to react with the fluoride are usually used.

In particularly persistent scales or especially thick, scales, the process may be repeated for best results.

Although the solvent of the invention may be used without a corrosion inhibitor, the presence of a corrosion inhibitor for added protection of the metal being treated is preferred. The presence of known inhibitors in no way interferes with the effectiveness of the solvent of the invention. Corrosion inhibitors such as arsenic compounds, e.g., H$_3$AsO$_4$, As$_2$O$_3$, and alkali metal arsenates, and organic sulfur compounds e.g., mercaptans, and organic nitrogen bases can be employed. The organic nitrogen bases are the preferred inhibitors to use. These inhibitors include pyridine, alpha-, beta-, and gamma-picoline, 2-n-amylpyridine, 4-n-amylpyridine, 2-hexylpyridine, 2,4-lutidine, quinoline, lepidine, and quinaldine. Other suitable organic nitrogen-base inhibitors are rosin amines and hydrogenated rosin amines described in U.S. Patents 2,510,063 and 2,510,284.

The practice of the invention offers a number of advantages among which are: effective dissolution of difficultly removable fluorine-containing scale deposits, simplicity of composition, economy and ready availability of materials, and convenience of application.

Having described the invention what is claimed and desired to be protected by Letters Patent is:

1. A solvent for the removal of fluorine-containing scale from metal surfaces which comprises a 3 to 30 percent aqueous solution of hydrochloric acid having dissolved therein a boron compound selected from the class consisting of H$_3$BO$_3$ and borax in an amount based on the weight of the solvent of between 0.05 and 5.5 percent when the boron compound is H$_3$BO$_3$ and between 0.075 and 8.7 percent when the boron compound is borax.

2. A solvent for the removal of fluorine-containing scale from metal surfaces which comprises an aqueous solution containing about 2.1 percent of H$_3$BO$_3$ and about 5 percent of HCl by weight.

3. A solvent for the removal of fluorine-containing scale from metal surfaces which comprises an aqueous slurry consisting of 3 to 30 weight percent hydrochloric acid and a boron compound selected from the class consisting of borax and boric acid in an amount in excess of the saturation point, but not in excess of that readily held in suspension in said slurry with gentle agitation, of said boron compound and containing an inhibitor to acidic corrosion of said metal surface.

4. The method of removing a fluorine-containing scale from a scale-coated metal surface consisting of subjecting said surface to the action of a solution of a boron compound selected from the class consisting of boric acid and sodium tetraborate dissolved in a 3 to 30 weight percent aqueous solution of HCl wherein the boron compound comprises between 0.125 and 5 times the stoichiometric quantity required to react with the fluoride of the scale, allowing said solution to remain in contact with the surface requiring scale to be removed therefrom for from 2 to 20 hours at between 80° and 200° F., and draining the solution from said surface.

5. The method of removing scale according to claim 4, wherein the step of draining the solution from said surface is followed by contacting the surface with an aqueous alkaline solution, thereafter draining the alkaline solution therefrom, and flushing said surface with water.

6. A solvent of claim 1, which contains between 0.1 and 1.0 percent by weight of an inhibitor to acidic corrosion of metal.

7. The solvent of claim 6, when said inhibitor is an organic nitrogen-base compound.

References Cited in the file of this patent

UNITED STATES PATENTS 429,435     Gilbert                June 3, 1890